(12) United States Patent
Parcq et al.

(10) Patent No.: US 10,160,815 B2
(45) Date of Patent: Dec. 25, 2018

(54) DEXTRIN COPOLYMER WITH STYRENE AND AN ACRYLIC ESTER, MANUFACTURING METHOD THEREOF, AND USE THEREOF FOR PAPER COATING

(71) Applicant: ROQUETTE FRERES, Lestrem (FR)

(72) Inventors: Julien Parcq, Lille (FR); Vincent Wiatz, Lomme (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 15/503,909

(22) PCT Filed: Aug. 13, 2015

(86) PCT No.: PCT/FR2015/052206
§ 371 (c)(1),
(2) Date: Feb. 14, 2017

(87) PCT Pub. No.: WO2016/024070
PCT Pub. Date: Feb. 18, 2016

(65) Prior Publication Data
US 2017/0275387 A1  Sep. 28, 2017

(30) Foreign Application Priority Data

Aug. 14, 2014 (FR) ..................... 14 57813

(51) Int. Cl.
| | |
|---|---|
| *C08L 3/02* | (2006.01) |
| *C08B 30/18* | (2006.01) |
| *C08F 251/00* | (2006.01) |
| *D21H 19/54* | (2006.01) |
| *D21H 21/16* | (2006.01) |
| *C08F 212/08* | (2006.01) |
| *C08F 220/06* | (2006.01) |

(52) U.S. Cl.
CPC ............ *C08B 30/18* (2013.01); *C08F 212/08* (2013.01); *C08F 220/06* (2013.01); *C08F 251/00* (2013.01); *C08L 3/02* (2013.01); *D21H 19/54* (2013.01); *D21H 21/16* (2013.01)

(58) Field of Classification Search
CPC .......................................................... C08L 3/02
See application file for complete search history.

(56) References Cited

U.S. PATENT DOCUMENTS

| | | | | | |
|---|---|---|---|---|---|
| 3,061,471 | A | * | 10/1962 | Brockway | C08G 18/10 427/434.6 |
| 3,061,472 | A | | 10/1962 | Charles et al. | |
| 4,057,683 | A | * | 11/1977 | Elting | C08F 2/44 507/118 |
| 4,131,576 | A | * | 12/1978 | Iovine | C08F 251/00 527/312 |
| 4,171,407 | A | * | 10/1979 | Elser | C09D 133/064 428/500 |
| 4,552,940 | A | * | 11/1985 | Van Eenam | C08F 251/00 428/113 |
| 4,575,528 | A | * | 3/1986 | Van Eenam | C08F 251/00 524/287 |
| 4,604,163 | A | * | 8/1986 | Van Eenam | C08F 251/00 162/168.1 |
| 5,003,022 | A | * | 3/1991 | Nguyen | C08F 251/00 428/511 |
| 5,004,767 | A | * | 4/1991 | Krause | C08F 20/12 524/30 |
| 5,055,504 | A | * | 10/1991 | Mahil | C08L 33/08 428/560 |
| 5,055,541 | A | * | 10/1991 | Floyd | C08F 251/00 527/300 |
| 5,116,927 | A | * | 5/1992 | Floyd | C08F 251/00 527/300 |
| 5,147,907 | A | * | 9/1992 | Rinck | C08F 236/04 524/47 |
| 5,227,446 | A | * | 7/1993 | Denzinger | C08F 251/00 526/238.2 |
| 5,334,287 | A | * | 8/1994 | Hartmann | C08F 251/00 162/175 |
| 5,425,784 | A | * | 6/1995 | Denzinger | C08F 251/00 252/8.57 |
| 5,578,678 | A | * | 11/1996 | Hartmann | C08F 251/00 525/54.3 |
| 6,090,884 | A | * | 7/2000 | Hurley | C08F 251/00 106/31.71 |
| 6,423,775 | B1 | * | 7/2002 | Brune | C08F 290/10 525/54.31 |
| 9,315,943 | B2 | * | 4/2016 | Cimpeanu | D21H 21/16 |
| 2007/0021577 | A1 | * | 1/2007 | Rodrigues | C02F 5/10 527/309 |
| 2008/0020948 | A1 | * | 1/2008 | Rodrigues | C02F 5/10 507/112 |
| 2008/0020961 | A1 | * | 1/2008 | Rodrigues et al. | C02F 5/10 510/475 |
| 2009/0131563 | A1 | * | 5/2009 | Wang | C08B 31/00 524/96 |

(Continued)

FOREIGN PATENT DOCUMENTS

| | | |
|---|---|---|
| EP | 1 281 721 A1 | 2/2003 |
| JP | 58115196 A * | 7/1983 |

(Continued)

OTHER PUBLICATIONS

Translation of JP-58115196-A (Year: 2017).*
International Search Report, dated Nov. 11, 2015, from corresponding PCT application.

*Primary Examiner* — Liam J Heincer

(57) ABSTRACT

Disclosed is a copolymer of a dextrin and at least two hydrophobic monomers made up of styrene and at least one straight or branched acrylic C1-C4 ester. The invention also relates to the manufacturing method thereof and to the use thereof in paper coating. The copolymer has high dextrin content (>60 wt % relative to the weight of the dextrin and the hydrophobic monomers) so as to favor the biosourced aspect of the material, and provides very good hydrophobicity for the paper sheet.

18 Claims, No Drawings

(56) References Cited

U.S. PATENT DOCUMENTS

| | | | | |
|---|---|---|---|---|
| 2009/0139675 | A1* | 6/2009 | Stein | C08F 2/26 |
| | | | | 162/164.6 |
| 2010/0236736 | A1* | 9/2010 | Brockmeyer | C08F 2/26 |
| | | | | 162/168.2 |
| 2011/0021734 | A1* | 1/2011 | Samaranayake | C08B 31/00 |
| | | | | 527/314 |
| 2011/0230387 | A1* | 9/2011 | Leyrer | C08F 220/18 |
| | | | | 510/434 |
| 2012/0128608 | A1* | 5/2012 | Rodrigues | C02F 5/10 |
| | | | | 424/59 |
| 2012/0180970 | A1* | 7/2012 | Song | C08F 2/24 |
| | | | | 162/164.7 |
| 2013/0040870 | A1* | 2/2013 | Arisandy | C11D 3/3765 |
| | | | | 510/337 |
| 2014/0182064 | A1* | 7/2014 | Song | C08F 251/00 |
| | | | | 8/94.33 |
| 2014/0256880 | A1* | 9/2014 | Rodrigues | C08L 33/26 |
| | | | | 525/54.26 |
| 2014/0329104 | A1* | 11/2014 | Mesnager | C09D 103/02 |
| | | | | 428/537.5 |

FOREIGN PATENT DOCUMENTS

| | | |
|---|---|---|
| WO | 2005/003456 A1 | 1/2005 |
| WO | 2005/047385 A1 | 5/2005 |
| WO | 2013/072639 A1 | 5/2013 |

* cited by examiner

DEXTRIN COPOLYMER WITH STYRENE AND AN ACRYLIC ESTER, MANUFACTURING METHOD THEREOF, AND USE THEREOF FOR PAPER COATING

A sheet of paper or of cardboard is a support produced from cellulose fibers. These fibers are mainly extracted from wood or from paper and cardboard recovered and intended to be recycled. The production of such a sheet involves several steps. In a first step, the paper pulp is produced by separating the cellulose fibers. In a second step, the pulp is diluted in water before reaching the headbox of the paper machine, which uniformly distributes the fibers and gives the flow of the pulp in suspension its geometry. It is then necessary to eliminate the water so as to structure the sheet of paper. To do this, the latter undergoes successive operations of draining, pressing, passing between rollers, and finally drying.

In the paper and cardboard industry, there are numerous product qualities. High-quality papers and cardboards, for example those used for magazines or brochures, are products that are grouped under the term "coated papers". The "coating" corresponds to a subsequent operation where the surface of the drained and dried paper is covered with one or more "coats", generally based on pigments as a mixture with binders and various additional products.

These coats are applied by a process carried out using aqueous compositions referred to as "coating colors". The objective of this operation is to render the surface of the paper, which is rough and macroporous in the absence of treatment, even and microporous, in order to enable a better reproduction of the printings. Furthermore, it is possible via this operation to enhance the whiteness, gloss or else feel of the printed paper.

As its name indicates, the main role of the binder of the coating color is to ensure the cohesion of the various ingredients within the coating color. Historically, use has been made of products of synthetic origin, such as acrylic latices or styrene-butadiene latices. More recently, it has been sought to replace these products derived from the petrochemical industry with solutions of plant origin that are less expensive, more environmentally friendly and more respectful of our natural resources. In light of the binder contents used in coating colors (which may reach 25% of the total weight of the dry matter), it is understood that this problem of replacing the synthetic latices has become a major challenge for the paper industry.

Dextrins constitute one of these solutions derived from plant chemistry. Commonly denoted under this term is a starch modified in the dry phase by the action of heat, the use of a chemical reagent, the action of ionizing radiation or the combinations of these various means. These products are well known and widely described in the literature. The STABILYS® range sold by the Applicant is one example of such commercial products. These dextrins typically have an average molecular mass between 60 000 and 2 500 000 daltons (Da).

The use of dextrins in coating colors is already well documented in the prior art. Patent application EP 1 281 721 reports dextrins derived from a heat treatment of starch, and mentions the use thereof in the paper field, more particularly as sizing and coating agent. Patent application WO 2005/047385 describes compositions based on two chemically, physically or enzymatically modified starches and the use thereof in the coating of paper. The Applicant has itself described, in patent application WO 2005/003456, compositions based on modified starch which are used for the adhesive bonding and the coating of paper and cardboard. The rheology of the coating colors and the water retention are improved by the use of such compositions.

However, dextrins have a character of complete or at the very least partial solubility in water, which may present drawbacks in view of the use thereof in coating colors. Indeed, after application and drying of said coating color on the paper or cardboard, it is important to have a surface that is resistant to the penetration of hydrophilic species such as water and aqueous inks. It will therefore be sought to increase its degree of hydrophobicity. However, the entirely natural solutions based exclusively on modified starches cannot be suitable in this regard: it is advisable to add a hydrophobic component thereto, most of the time in the form of a graft monomer of non-hydrophilic nature.

In this regard, documents U.S. Pat. No. 3,061,471 and U.S. Pat. No. 3,061,472 describe a process for polymerizing an acrylic acid ester in the presence of starch or dextrin, the starch or dextrin:acrylic acid weight ratio being between 6:4 or 7:3 and 1:19. The resulting product is used for sizing hydrophobic fibers, the amount of starch or dextrin used making it possible to maintain the viscosity of the product within an acceptable range.

Document U.S. Pat. No. 5,004,767 describes a process for polymerizing acrylic monomers, in which a dextrin is used as protective colloid with a view to preventing the coagulation or the precipitation of the polymer particles formed. This dextrin has very few high molecular masses (less than 6% by weight having a weight-average molecular mass greater than 25 000 Da), and is used in an amount of 60% by weight at most relative to the total dry weight of dextrin and acrylic monomers. The final product may be used as an adhesive in the paper industry.

Document U.S. Pat. No. 5,147,907 describes a process for polymerizing unsaturated ethylenic monomers, in the presence of a dextrin that makes it possible to stabilize the dispersion obtained. This dextrin is used up to a limit of 200 parts by weight per 100 parts of initial monomers, and has at most 5% by weight of a fraction having a weight-average molecular mass greater than 60 000 Da. The resulting polymer may be used as a sizing agent in the manufacture of paper.

Document U.S. Pat. No. 5,578,678 describes polymers grafted, by reaction between a monomer containing mono-, oligo- or polysaccharide units, with an unsaturated monoethylenic monomer, the theoretical mixture by weight between these two constituents ranging from 80:20 to 5:95. Document U.S. Pat. No. 5,227,446 similarly describes polymers grafted, by reaction between a monomer containing mono-, oligo- or polysaccharide units that have undergone a chemical modification, with an unsaturated monoethylenic monomer, the theoretical mixture by weight between these two constituents ranging from 80:5 to 20:95. It should be noted that these two documents do not exemplify % by weight of dextrin greater than 60%, relative to the total weight of dextrin and hydrophobic monomers.

Following which, to date there is no technical solution based on dextrins polymerized with hydrophobic monomers capable of exhibiting the following advantages, namely a very good compromise between:
- a high content of dextrin (>60% by weight relative to the weight of dextrin and hydrophobic monomers) in order to favor the biobased aspect of the product;
- a very good hydrophobicity with regard to the sheet of paper.

Continuing its research in this direction, the Applicant has been able to develop such a product. This product is in particular based on the judicious choice of two hydrophobic monomers, and on a precise adjustment of their relative proportions which lead to unexpected synergistic effects in the hydrophobization of the coated paper.

In this particular case, this solution is based precisely on a copolymer of a dextrin and of at least two hydrophobic monomers:

said dextrin representing at least 60% by weight of the total weight of dextrin and hydrophobic monomers and having a weight-average molecular mass that ranges from 60 000 Da to 2 000 000 Da, the hydrophobic monomers being constituted by styrene and by at least one linear or branched C1 to C4 acrylic ester, the styrene:ester weight ratio being between 10:90 and 90:10.

Furthermore, the Applicant has also developed a process for manufacturing such a copolymer, while showing that it was the optimization of the nature and of the amount of the polymerization initiator system that made it possible to obtain both a high degree of conversion of hydrophobic monomers and also a very good hydrophobicity with regard to the sheet of paper.

Therefore, a first subject of the present invention consists of a process for the free-radical polymerization between a dextrin and at least two hydrophobic monomers, said dextrin representing at least 60% by weight of the total weight of dextrin and hydrophobic monomers and having a weight-average molecular mass that ranges from 60 000 Da to 2 000 000 Da, the hydrophobic monomers being constituted by styrene and by at least one linear or branched C1 to C4 acrylic ester, the styrene:ester weight ratio being between 10:90 and 90:10, this process being characterized in that the polymerization takes place in the presence of a free-radical initiator which is a persulfate, in a dosage of between 0.5% and 2.5% by dry weight relative to the dry weight of dextrin.

One of the advantages of the present invention lies in the choice of the experimental conditions and in particular in the selection of the nature of the initiator and of the dose used for obtaining the desired effect. The choice of the initiator and the dose introduced during the reaction will potentially have an impact on the molecular mass distribution and the viscosity of the medium, through cleavage phenomena of glycosidic bonds subjected to the influence of the temperature and of the radicals generated in the medium. It has in particular been observed by the Applicant that the selection of the initiator of the free-radical polymerization reaction and the dosage thereof were critical parameters with respect to the properties of the products obtained.

In the present case, it is essential to use a persulfate, preferably sodium or potassium persulfate, in a dosage between 0.5% and 2.5% by dry weight relative to the dry weight of dextrin.

The process according to the present invention is also characterized in that the dextrin represents at least 60%, preferably at least 70%, and more preferably still at least 80% by weight of the total weight of dextrin, styrene and ester.

According to a first variant, the dextrin has a weight-average molecular mass that ranges from 500 000 Da to 1 500 000 Da, and more preferably has a mass fraction greater than 5% of molecules having a weight-average molecular mass greater than 1 000 000 Da, preferably a fraction between 5% and 25%.

According to a second variant, the dextrin has a weight-average molecular mass that ranges from 60 000 Da to 500 000 Da.

Preferably, the styrene:ester weight ratio is between 10:90 and 90:10, more preferably between 80:20 and 20:80.

Equally preferably, the ester is a butyl (meth)acrylate, preferably butyl acrylate.

Prior to the polymerization reaction, it is advisable to provide a dextrin suitable for being used during said polymerization. This is carried out using a starch, the granules of which will be destructured by an input of thermal, mechanical or chemical (alkaline agent, oxidant, etc.) energy or by combining these energies (input of chemical and thermal energy or of mechanical and thermal energy, etc.), in the presence of water so that the starch chains are completely dispersed in the reaction medium.

This step may be carried out according to various processes that are well known to a person skilled in the art. Mention may be made, by way of example, of cooking in a closed reactor, at atmospheric pressure (conventional closed reactor) or under pressure (autoclave), cooking using a jet cooker, batch cooking by addition of steam, or the use of an extruder (input of mechanical and thermal energy). In any case, it is a question of maintaining the milk of amylaceous derivative at a temperature above the gelatinization temperature of the latter (in general a temperature above 85° C.) in addition to an optional input of mechanical energy or chemical treatment. The starch will thus lose its crystalline structure (the granule will be destructured thus releasing its content), and be dispersed in the medium of the reaction. This step is often accompanied by an increase in viscosity that is dependent on the nature of the amylaceous derivative in question.

The amylaceous derivatives of interest are native starches or chemically modified starches (dextrin-type heat-treated, crosslinked, stabilized starches, oxidized starches, or starches that have been fluidized enzymatically or by acid treatment, cationic or anionic starches, etc.). It is also possible to carry out an enzymatic conversion, or an oxidizing or acid treatment prior to the free-radical polymerization reaction so as to adjust certain quantities such as the viscosity of the medium.

A "size" is then obtained constituted of said dextrin that has undergone the aforementioned treatments, this dextrin being suspended in water, having a solids extract of at least 10% by weight and of at most 60% by weight, this solids extract more preferably being between 15% and 50% by weight. The "size" is the aqueous suspension containing said dextrin.

The actual free-radical polymerization reaction is then carried out. This reaction takes place either in the reactor that was used to manufacture the aqueous suspension of dextrin, or in a separate reactor. The first solution is preferred.

In both cases, the polymerization reaction takes place by introducing the monomers (styrene and acrylic ester(s)) and adding the free-radical initiator.

The reactants (monomers, initiators) may be introduced in pure (solid or liquid) form, or be introduced in the form of aqueous solutions or a dispersion after prior emulsification. These reactants may be introduced into the reaction medium in a conventional batch mode (introducing all the reactants into the reactor in full or in fractions) or as a continuous feed.

It is possible to choose to premix certain additives such as for example the hydrophobic monomers.

In order to control the growth of the polymer chains being formed at the surface of the starch, it is possible to add chain-transfer agents to the medium. These reactants may, here too, be introduced in full or in fractions into the reactor at the start or during the reaction, or be added continuously during the free-radical polymerization. Mention may be made, by way of example, but non-exhaustively, of thiols (e.g. n-butylthiols, mercaptoethanol), halomethanes (e.g. chloroform), compounds having disulfide bridges, or organic compounds such as (cyclic or acyclic) terpenes.

It is also possible to firstly introduce the hydrophobic monomers into the reactor, then to subsequently add the dextrin and the free-radical initiator.

In one preferred embodiment, the reactor containing the dextrin is fed continuously by a solution of initiator and of monomers that are introduced separately but at the same time, continuously for a time that may range from 15 minutes to 10 hours, preferably from 30 minutes to 5 hours.

In one preferred embodiment, the dextrin suspension is produced by mixing, with stirring, said dextrin in water at ambient temperature. This suspension is then heated at a temperature above 80° C. and preferably at a temperature of 95° C. approximately for 30 minutes, so as to destructure the amylaceous base used and make as many of its reactive functions as possible accessible.

The stirred suspension is then placed at the temperature of the reaction, which here is 85° C. The aqueous initiator solution and the mixture of monomers are introduced over 1 hour continuously, separately but at the same time. The reaction medium is kept stirring at the temperature of the reaction, i.e. 85° C., for an additional 30 minutes.

The product obtained could be in the form of a gel or a viscous or fluid paste, of short or longer texture. The color of the product thus obtained will vary from white to brown, depending on the amount and on the nature of the reactants used for the polymerization.

The product obtained could also have its pH adjusted by addition of alkaline agent or acid at the end of the reaction in order to achieve values compatible with its use in the targeted applications. The pH could however be regulated during the reaction by addition of sufficient amounts of an alkaline agent such as sodium hydroxide or of an acid.

A second subject of the present invention consists of a copolymer of a dextrin and at least two hydrophobic monomers,
- said dextrin representing at least 60% by weight of the total weight of dextrin and hydrophobic monomers and having a weight-average molecular mass that ranges from 60 000 Da to 2 000 000 Da,
- the hydrophobic monomers being constituted by styrene and by at least one linear or branched C1 to C4 acrylic ester, the styrene:ester weight ratio being between 10:90 and 90:10.

This copolymer is also characterized in that the dextrin represents at least 60%, more preferably at least 70%, and most preferably at least 80% by weight of the total weight of dextrin, styrene and ester.

According to a first variant, the dextrin has a weight-average molecular mass that ranges from 500 000 Da to 1 500 000 Da, and preferably has a mass fraction greater than 5% of molecules having a molecular mass greater than 1 000 000 Da, preferably a mass fraction between 5% and 25%.

According to a second variant, the dextrin has a weight-average molecular mass that ranges from 60 000 Da to 500 000 Da.

Preferably, the styrene:ester weight ratio is between 10:90 and 90:10, preferably between 80:20 and 20:80.

Equally preferably, the ester is a butyl (meth)acrylate, preferably butyl acrylate.

Another subject of the present invention consists of an aqueous suspension containing the aforementioned copolymer. This suspension is in particular characterized in that it has a dry matter content or dry weight content of said copolymer greater than 10% of its total weight, and in particular between 10% and 50% of its total weight.

Another subject of the present invention consists of a coating color containing the aforementioned suspension or copolymer.

A final subject of the present invention consists of a paper coated on at least one of its faces with the aforementioned coating color.

EXAMPLES

Example 1

This example illustrates the influence of the nature of the initiator system used during the polymerization reaction on the degree of conversion of the hydrophobic monomers introduced.

The degree of conversion of the monomers introduced into the polymerization reaction is defined as being equal to the weight content of monomers actually grafted to the dextrin relative to the total weight of monomers involved. This content is understood indirectly by determining, for the product resulting from the polymerization reaction, the percentage increase in weight after precipitation in a solvent.

To begin with, a suspension of dextrin is produced by dispersing, in water and with sufficient stirring to enable said dextrin to be kept in suspension in the medium, 362 g as is of amylaceous derivative (i.e. 323 g dry) which is STABILYS® A025 sold by the Applicant. The suspension is produced so as to obtain a solids extract equal to 20% of its total weight.

This suspension is introduced into a jacketed 2-liter glass reactor, equipped with a non-thermostatted bottom valve that enables the product to be drawn off at the end of the reaction and with a cover provided with several inlet orifices making possible a separate introduction of reactants into the medium via pumps. The reactor is also equipped with branch connections that enable the introduction of (pH, temperature, etc.) probes for monitoring certain reaction parameters. The (Teflon-coated) stirrer is chosen so as to ensure a sufficient homogenization (presence of a vortex) in the event of an increase in viscosity.

The temperature in the reactor is then increased to 95° C. and this temperature is maintained for 30 minutes. The reaction medium is then brought to 85° C.

Next the monomers and the initiator are introduced. The free-radical initiator system is varied, while keeping the molar ratio between the dextrin and the initiator constant. In the case of the $H_2O_2/Fe(II)$ pair, the iron is introduced in the form of iron sulfate dissolved in drinking water (1% by mass solution) prior to the introduction of the monomers and the $H_2O_2$. In case of the $(NH_4)_2Ce(NO_3)_6/HNO_3$ pair, the nitric acid is introduced into the medium prior to the introduction of the monomers and the ammonium cerium nitrate solution. In the case of the sodium persulfate, this is introduced in the form of a 1.5 wt % aqueous solution.

In the case of the $H_2O_2/Fe(II)$ and $(NH_4)_2Ce(NO_3)_6/HNO_3$ initiator pairs, the species that generate the free radicals are the hydrogen peroxide and the cerium. It is therefore these reactants that are introduced continuously over 1 hour while the Fe(II) and the nitric acid are introduced initially into the medium so as to activate the formation of the radical species.

As regards the monomers, they are weighed separately, then introduced into a stoppered glass flask. The flask is then stirred manually so as to homogenize the mixture (mixture of 75% styrene and 25% n-butyl acrylate by mass). The monomers are then introduced continuously over 1 hour into the medium using a peristaltic pump. At the same time, the initiator (1% by mass $H_2O_2$ solution, or 7.9% by mass ammonium cerium nitrate solution, or 4% by mass persulfate solution) is also introduced continuously and separately from the monomers over 1 hour into the medium by means of a peristaltic pump.

After the end of the introduction of the reactants, the medium is left at 85° C. for 30 minutes with sufficient stirring to observe a vortex indicating a good homogenization. The product obtained is drawn off from the reactor and placed in a sealed container until it returns to ambient temperature.

sample will then be more accurate. The residual moisture of the sample is measured using a Mettler LJ16 thermobalance. It is thus possible to determine the dry mass of grafted starch.

Since the mass of dry starch in the reaction medium sampling is known, it is possible by comparison to know the mass of monomers grafted onto the starch (corresponding to the increase in mass of the sampled starch). The degree of conversion of the monomers is expressed as being equal to the % increase in the mass of the sample, relative to the mass of monomers initially introduced into the reaction.

All of the experimental data, and also the calculated degrees of conversion are given in table 1. It is very clearly apparent that the degrees of conversion according to the invention (tests carried out with sodium and potassium persulfates) are much higher than with the 2 other free-radical initiators.

TABLE 1

| | $H_2O_2/Fe^{++}$ tests | | $(NH_4)_2Ce-(NO_3)_6/$ $HNO_3$ tests | | Potassium persulfate | | Sodium persulfate |
|---|---|---|---|---|---|---|---|
| Mass of starch (g dry) | 323.7 | Starch in g dry | 323.9 | Starch in g dry | 323.8 | Starch in g dry | 323.8 |
| Mass of water (g) | 1356.4 | Total water in g | 1421.1 | Total water in g | 1417.1 | Total water in g | 1416.7 |
| $FeSO_4, 7H_2O$ in g com | 0.016 | $(NH_4)_2Ce(NO_3)_6$ in g dry | 10 | $K_2S_2O_8$ in g dry | 5 | $Na_2S_2O_8$ in g dry | 5.0 |
| $FeSO_4$ in g dry | 0.009 | 65% $HNO_3$ in g | 3.5 | | | | |
| 30% $H_2O_2$ in g | 2.2 | $HNO_3$ in g dry | 2.3 | | | | |
| $H_2O_2$ in g dry | 0.66 | | | | | | |
| initiator/starch (% by mass) | 0.2% | initiator/starch (% by mass) | 3.1% | initiator/starch (% by mass) | 1.5% | initiator/starch (% by mass) | 1.5% |
| Moles of initiator (mmol) | 19.4 | Moles of initiator (mmol) | 18.2 | Moles of initiator (mmol) | 18.5 | Moles of initiator (mmol) | 20.5 |
| Moles of initiator/moles of AGU | $9.7 * 10^{-3}$ | Moles of initiator/moles of AGU | $9.1 * 10^{-3}$ | Moles of initiator/moles of AGU | $9.2 * 10^{-3}$ | Moles of initiator/moles of AGU | $10 * 10^{-3}$ |
| Styrene in g | 49 | Styrene in g | 49.1 | Styrene in g | 48.8 | Styrene in g | 48.9 |
| N-Butyl acrylate (g) | 16.4 | N-Butyl acrylate (g) | 16.3 | N-Butyl acrylate (g) | 16.3 | N-Butyl acrylate (g) | 16.2 |
| Mass of styrene in the sampling (g) | 3.19 | Mass of styrene in the sampling (g) | 3.01 | Mass of styrene in the sampling (g) | 3.38 | Mass of styrene in the sampling (g) | 3.03 |
| Mass of n-butyl acrylate in the sampling (g) | 1.07 | Mass of n-butyl acrylate in the sampling (g) | 1 | Mass of n-butyl acrylate in the sampling (g) | 1.13 | Mass of n-butyl acrylate in the sampling (g) | 1.01 |
| Dry starch in the sample (g) | 21.04 | Dry starch in the sample (g) | 19.83 | Dry starch in the sample (g) | 22.46 | Dry starch in the sample (g) | 20.1 |
| Dry product recovered after precipitation in acetone and drying (g) | 22.2 | Dry product recovered after precipitation in acetone and drying (g) | 22.9 | Dry product recovered after precipitation in acetone and drying (g) | 26.6 | Dry product recovered after precipitation in acetone and drying (g) | 23.6 |
| Degree of conversion of the monomers in % | 27 | Degree of conversion of the monomers in % | 77 | Degree of conversion of the monomers in % | 92 | Degree of conversion of the monomers in % | 86 |

100 g of the product are then sampled using a syringe and dispersed dropwise and with stirring over 5 minutes, in 300 mL of ≥99% purity commercial acetone. The formation of solid white particles is observed. The flask is stoppered and left stirring at 25° C. for 16 hours.

The heterogeneous medium obtained—constituted of a white solid and of liquid—is filtered on a no. 3 sintered glass filter funnel, the pores of which are between 16 and 40 μm. The solid recovered is then transferred into a pre-tared crystallizing dish, then placed in the oven at 40° C. for 24 h. On leaving the oven, the product is milled for 5 minutes using an IKA A11 mill. This milling step makes it possible to prevent agglomerates of product. By obtaining particles of fine size, the measurement of the residual moisture of the AGU: AnhydroGlUcose Example 2

This example illustrates the influence of the initiator dose used, in the case of sodium persulfate.

The preceding example in the case where the free-radical initiator was sodium persulfate (1.5% by dry weight relative to the dry weight of dextrin previously) was therefore reproduced at other dosages: 5%, 2.5%, 0.5% and 0.1% by dry weight relative to the dry weight of dextrin.

The hydrophobicity of the aqueous suspensions of copolymers (dextrin + styrene/butyl acrylate) obtained by varying the amount of sodium persulfate is then evaluated after a step of direct coating of these suspensions on the surface of the paper according to methods known to a person skilled in the art.

In order to do this, laboratory sheets of paper known as handsheets are produced using a FRET device (handsheet retention tester) sold by TECHPAP. These handsheets have characteristics similar to client industrial paper, in particular as regards flocculation and retentions.

The process for manufacturing the handsheet uses a paper pulp which is a pulp of virgin fibers (50% softwood, 50% hardwood) with a degree of refining of 35° Schopper (SR). 35% (by dry weight relative to the total weight of the pulp) of natural calcium carbonate sold by OMYA® under the name Omyalite® 50 is added. The charged fibrous suspension has a concentration of 2.5 g/l. Next, 0.3% (dry equivalent/paper) of a HICAT® 5163AM size (ROQUETTE®) is added. Finally, 0.35% (relative to the paper) of an alkenyl succinic anhydride emulsion (Chemsize® A180 sold by CHEMEC®) is added. A handsheet having a basis weight of 70 g/m² is thus produced.

After manufacturing of the handsheet, it is placed between two sheets of blotting paper and the assembly is passed twice through a TECHPAP brand roller press. Next, the handsheet is separated from the blotting papers and then is placed on a TECHPAP brand dryer for 5 minutes at 100° C. Maturing of the handsheets is then carried out, by placing them in an oven at 110° C. for 30 minutes, in order to promote the action of the sizing agent. The handsheets are then placed for a minimum of 24 hours in an air-conditioned room at 23° C. (±1° C.) and 50% relative humidity (±2%) (ISO 187: 1990 and Tappi T402 sp-08 standards).

The copolymer suspension having 22% dry matter (measured using a Sartorius thermobalance) is deposited uniformly on the surface of a paper handsheet. In order to do this, a pre-tared handsheet is placed on a K303 MultiCoater type coating apparatus. The apparatus is set at a rate of displacement of the coating bar of 10 m/min so as to deposit the equivalent of 1.5 g of dry hydrophobic dextrin copolymer per m² of paper. The coated paper is weighed, then dried for 2 minutes in a ventilated oven, set at a temperature of 120° C.

A Cobb 60 measurement (ISO 535:1991 and Tappi T441 om-04 standards) is then carried out on the papers directly surface-treated by the suspension of copolymer (dextrin + styrene/butyl acrylate). This test relates to the hydrophobicity of the paper: the smaller the amount of water absorbed, the more hydrophobic the paper. The Cobb value of the non-surface-treated control paper is 112.

All of the results appear in table 2.

TABLE 2

| | Persulfate (% dry/dry starch) | | | | |
| --- | --- | --- | --- | --- | --- |
| | 5 | 2.5 | 1.5 | 0.5 | 0.1 |
| Degree of monomer conversion (%) | 92 | 85 | 86 | 65 | <2 |
| Cobb 60 | 82 | 76 | 40 | 62 | 98 |

It is therefore observed that the best hydrophobicity of the paper is obtained for a persulfate dose of between 0.5% and 1.5% by dry weight, relative to the dry weight of starch.

Furthermore, the best compromise between a high degree of conversion and a low Cobb 60 value is obtained when 1.5% by dry weight of sodium persulfate relative to the dry weight of starch is used.

Example 3

This example illustrates the influence of the relative content of styrene and of butyl acrylate on the hydrophobicity properties of the dextrin synthesized with regard to the sheet of paper.

362.3 g of commercial dextrin of STABILYS® A025 type, having a residual moisture of 10.3% (325.0 g dry; 2.0 mol of anhydroglucose units) are mixed, with stirring, with 1262.7 g of drinking water. The milk is introduced into a reactor, and kept stirring with the aid of a mechanical stirrer.

The reactor used is a jacketed 2-liter glass reactor, equipped with a non-thermostatted bottom valve that enables the product to be drawn off at the end of the reaction. The reactor is also equipped with branch connections that enable the introduction of (pH, temperature, etc.) probes for monitoring certain reaction parameters. The reactor also has a stirring device.

The milk is heated and maintained at a temperature of 95° C. for 30 minutes (formation of a dextrin size). After 30 minutes, the medium is cooled to the selected reaction temperature (85° C.).

The monomers used are styrene and butyl acrylate. The mixture of monomers consists of 65 g of styrene/n-butyl acrylate mixture (taking into account the amount of dry dextrin introduced, here 325 g, the starch therefore here represents more than 80% by weight of the starch/styrene/n-butyl acrylate mixture). The proportion of styrene and n-butyl acrylate may vary depending on the tests.

This mixture is introduced into the medium at 85° C., with stirring, using a peristaltic pump at constant flow rate over 1 h. At the same time, the initiator, here potassium persulfate ($K_2S_2O_8$) (4.875 g; 1.5% by weight/dry starch) is introduced into the medium in the form of an aqueous solution (3.9% by weight solution in drinking water) at constant flow rate using a peristaltic pump. The two additions are carried out separately but at the same time. A whitening and an increase in the viscosity of the medium are noted as the reactants are introduced.

When the introduction of the reactants is completed, the medium is left stirring at 85° C. for an additional 30 minutes. At the end of the reaction, the reaction medium is recovered for use in the targeted application.

Various tests are thus carried out, in which the proportions by weight of styrene and of butyl acrylate are varied. The corresponding data appear in table 3. These tests numbered from 2 to 10 therefore correspond to copolymers, the dextrin content of which is equal to 80% by weight of the total weight of dextrin and hydrophobic monomer (table 4). In an identical manner, tests 11 to 19 are also carried out where this content is equal to 90%. In an identical manner, tests 20 to 28 are also carried out where this content is equal to 70% (table 5). Test no. 1 corresponds to dextrin alone.

Coating colors are then manufactured, by mixing:
100 parts by weight of Hydrocarb 60 (calcium carbonate) sold by OMYA,
3 parts by weight of Litex PX 9450 (styrene-butadiene binder) sold by BASF,
0.2 part by weight of Rheocoat 66 (rheological agent) sold by COATEX,
and 7 parts by weight of the copolymer synthesized with 5%, 2.5%, 0.5% and 0.1% by dry weight of sodium persulfate relative to the dry weight of dextrin.

The dry material content of each coating color is adjusted to 66% by weight of its total weight.

The ability of the coating colors to make the surface of a paper on which they are applied more hydrophobic is then tested.

In order to do this, laboratory sheets of paper known as handsheets are produced using a FRET device (handsheet retention tester) sold by TECHPAP. These handsheets have characteristics similar to client industrial paper, in particular as regards flocculation and retentions.

The process for manufacturing the handsheet uses a paper pulp which is a pulp of virgin fibers (50% softwood, 50% hardwood) with a degree of refining of 35° Schopper (SR). 35% (by dry weight relative to the total weight of the pulp) of natural calcium carbonate sold by OMYA® under the name Omyalite® 50 is added. The charged fibrous suspension has a concentration of 2.5 g/l. Next, 0.3% (dry equivalent/paper) of a HICAT® 5163AM size (ROQUETTE®) is added. Finally, 0.35% (relative to the paper) of an alkenyl succinic anhydride emulsion (Chemsize® A180 sold by CHEMEC®) is added. A handsheet having a basis weight of 70 g/m² is thus produced.

The coating colors are then applied to the paper using a Dixon HeliCoater set at a speed of 1000 rpm and a blade pressure of 3 mm so as to obtain deposits of the order of 13 g of dry coating color per m² of paper. The drying step is carried out by infrared lamps present on the rear face of the HeliCoater. Finally, the Cobb 60 value is measured as indicated in the preceding example.

For all of the tests nos. 1 to 28, the results are therefore reported in tables 3 to 5 (in these 3 tables, the % of hydrophobic monomer are given as % by weight relative to the total weight of the 2 monomers).

TABLE 3

| | Test No. | | | | | | | | | |
|---|---|---|---|---|---|---|---|---|---|---|
| | 1 | 2 | 3 | 4 | 5 | 6 | 7 | 8 | 9 | 10 |
| % styrene | 0 | 100 | 90 | 75 | 60 | 50 | 40 | 25 | 10 | 0 |
| % butyl acrylate | 0 | 0 | 10 | 25 | 40 | 50 | 60 | 75 | 90 | 100 |
| Cobb 60 | 108 | 82 | 75 | 64 | 62 | 60 | 63 | 68 | 83 | 82 |

TABLE 4

| | Test No. | | | | | | | | | |
|---|---|---|---|---|---|---|---|---|---|---|
| | 1 | 11 | 12 | 13 | 14 | 15 | 16 | 17 | 18 | 19 |
| % styrene | 0 | 100 | 90 | 75 | 60 | 50 | 40 | 25 | 10 | 0 |
| % butyl acrylate | 0 | 0 | 10 | 25 | 40 | 50 | 60 | 75 | 90 | 100 |
| Cobb 60 | 108 | 95 | 83 | 77 | 69 | 67 | 72 | 88 | 99 | 102 |

TABLE 5

| | Test No. | | | | | | | | | |
|---|---|---|---|---|---|---|---|---|---|---|
| | 1 | 20 | 21 | 22 | 23 | 24 | 25 | 26 | 27 | 28 |
| % styrene | 0 | 100 | 90 | 75 | 60 | 50 | 40 | 25 | 10 | 0 |
| % butyl acrylate | 0 | 0 | 10 | 25 | 40 | 50 | 60 | 75 | 90 | 100 |
| Cobb 60 | 108 | 73 | 66 | 60 | 59 | 55 | 61 | 64 | 77 | 79 |

It is observed that the lowest Cobb values are obtained for the monomer contents characteristic of the present invention.

The invention claimed is:

1. A free-radical polymerization process between a dextrin and at least two hydrophobic monomers, said dextrin representing at least 60% by weight of the total weight of dextrin and hydrophobic monomers, and having a weight-average molecular mass that ranges from 500,000 Da to 2,000,000 Da, the hydrophobic monomers being constituted by of styrene and at least one linear or branched acrylic C1 to C4 ester, at a styrene:ester weight ratio between 10:90 and 90:10, said polymerization being conducted in the presence of a persulfate free-radical initiator, in a dosage of between 0.5% and 2.5% by dry weight relative to the dry weight of the dextrin, wherein the dextrin has a mass fraction greater than 5% of molecules having a weight-average molecular mass greater than 1,000,000 Da.

2. The process as claimed in claim 1, wherein the ester is a butyl acrylate.

3. The process as claimed in claim 1, wherein the styrene:ester weight ratio is between 25:75 and 75:25.

4. The process as claimed in claim 1, wherein the persulfate is sodium persulfate or potassium persulfate.

5. The process as claimed in claim 1, wherein the dextrin represents at least 70%, by weight of the total weight of dextrin, styrene and ester.

6. The process as claimed in claim 1, Wherein the dextrin has a weight-average molecular mass that ranges from 500,000 Da to 1,500,000 Da.

7. The process as claimed in claim 6, wherein the dextrin represents at least 70% by weight of the total weight of dextrin, styrene and ester.

8. The process as claimed in claim 6, wherein the dextrin represents at least 80% by weight of the total weight of dextrin, styrene and ester.

9. The process as claimed in claim 1, wherein the styrene:ester weight ratio is between 20:80 and 80:20.

10. The process as claimed in claim 1, wherein the ester is a butyl (meth)acrylate.

11. A free-radical polymerization process between a dextrin and hydrophobic monomers, said dextrin representing at least 70% by weight of the total weight of dextrin and hydrophobic monomers, and having a weight-average molecular mass that ranges from 60,000 Da to 2,000,000 Da, said hydrophobic monomers being constituted by, styrene and at least one linear or branched C1 to C4 acrylic ester, at a styrene:ester weight ratio of between 20:80 and 80:20, said polymerization being conducted in the presence of a persulfate free-radical initiator in an amount of between 0.5% and about 1.5% by dry weight relative to the dry weight of dextrin, wherein the dextrin has a mass fraction between 5% and 25% of molecules having a weight-average molecular mass greater than 1,000,000 Da.

12. The process as claimed in claim 11, wherein the ester is a butyl acrylate.

13. The process as claimed in claim 11, wherein the styrene:ester weight ratio is between 25:75 and 75:25.

14. The process as claimed in claim 11, wherein the persulfate is sodium persulfate or potassium persulfate.

15. The process as claimed in claim 11, wherein the dextrin has a weight-average molecular mass that ranges from 500,000 Da to 1,500,000 Da.

16. The process as claimed in claim 11, wherein the dextrin has a weight-average molecular mass that ranges from 60,000 Da to 500,000 Da.

17. The process as claimed in claim 11, wherein the ester is a butyl (meth)acrylate.

18. The process as claimed in claim 11, wherein the dextrin represents at least 80% b weight of the total weight of dextrin, styrene and ester.

* * * * *